(12) United States Patent
Shapiro (10) Patent No.: US 8,404,113 B2
(45) Date of Patent: Mar. 26, 2013

(54) TRANSPORTABLE DISASTER-RELIEF SYSTEMS

(76) Inventor: Irwin Shapiro, Allendale, SC (US)

( * ) Notice: Subject to any disclaimer, the term of this patent is extended or adjusted under 35 U.S.C. 154(b) by 0 days.

(21) Appl. No.: 13/048,812

(22) Filed: Mar. 15, 2011

(65) Prior Publication Data

US 2012/0125851 A1 May 24, 2012

Related U.S. Application Data (60) Provisional application No. 61/417,071, filed on Nov. 24, 2010.

(51) Int. Cl.
*B01D 36/00* (2006.01)
*F25C 1/22* (2006.01)

(52) U.S. Cl. ............. 210/182; 62/340; 62/342; 62/356; 62/389; 210/188; 210/192; 210/202; 210/203; 210/241

(58) Field of Classification Search .................. 210/143, 210/170.11, 192, 202, 203, 241, 257.1, 257.2, 210/258, 259, 321.6, 120, 188, 175, 182; 62/340, 342, 356, 389; 222/189.06, 189.11, 222/146.1, 146.6
See application file for complete search history.

(56) References Cited

U.S. PATENT DOCUMENTS

| | | | | |
|---|---|---|---|---|
| 5,112,477 A | * | 5/1992 | Hamlin | ............................ 210/85 |
| 5,203,989 A | * | 4/1993 | Reidy | ........................... 210/137 |
| 5,547,584 A | * | 8/1996 | Capehart | ........................ 210/669 |
| 5,632,892 A | * | 5/1997 | Klein | ........................... 210/257.2 |
| 5,741,416 A | * | 4/1998 | Tempest, Jr. | ..................... 210/90 |
| 5,997,737 A | * | 12/1999 | Sturdevant et al. | ...... 210/170.11 |
| 6,289,684 B1 | | 9/2001 | Guidry et al. | |
| 6,464,884 B1 | | 10/2002 | Gadgil | |
| 6,936,176 B1 | | 8/2005 | Greene, III et al. | |
| 7,089,763 B2 | | 8/2006 | Forsberg et al. | |
| 7,749,380 B2 | * | 7/2010 | Yungner et al. | ................ 210/143 |
| 2003/0089120 A1 | * | 5/2003 | Kampert et al. | ................. 62/188 |
| 2005/0016906 A1 | * | 1/2005 | Gettman | ........................ 210/143 |
| 2006/0113251 A1 | | 6/2006 | McGuire et al. | |
| 2006/0257258 A1 | | 11/2006 | Zwebner | |
| 2008/0245092 A1 | * | 10/2008 | Forsberg et al. | ................. 62/288 |
| 2010/0307973 A1 | * | 12/2010 | Grcevic | ........................ 210/639 |

* cited by examiner

*Primary Examiner* — Joseph Drodge (74) *Attorney, Agent, or Firm* — RG Patent Consulting LLC; Rachel Gilboy (57) ABSTRACT

A transportable disaster-relief generating system is a power generated, multi-functional, and compact relief unit with means for providing area lighting via a power generator, purifying and storing potable water from a non-potable water source, and creating ice utilizing purified water. The disaster-relief unit of the present invention may further provide a portable ice storage bin in a knockdown configuration to hold a large quantity of ice. A bladder may be used to hold potable water produced. The equipment is physically protected by the structural framework and base. The device may comprise access doors and suitable paneling on the walls and roof of the device.

20 Claims, 9 Drawing Sheets

FIG. 9

TRANSPORTABLE DISASTER-RELIEF SYSTEMS

CROSS-REFERENCE TO RELATED APPLICATION

The present application is related to and claims priority from prior provisional application Ser. No. 61/417,071, filed Nov. 24, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of disaster-relief systems and more specifically relates to transportable disaster-relief generating systems for providing portable power generation and potable water producing means. The device may be used in response to an emergency or disaster to safely and sanitarily purvey water, ice, and area lighting.

2. Description of the Related Art

Modern societies depend greatly on power to provide electricity, communication, transportation, and food to its inhabitants. As society continues to technologically evolve, human beings become increasingly more reliant on power and electricity. Power and power generation remains the constant variable that fuels infrastructure of modern society. This is true even to the point where bare necessities such as food and water are produced and sustained by power.

Floods, hurricanes, earthquakes, wars and other disastrous events often yield cataclysmic results, including mass power outages. Without power, a large population of people lose access to light, clean water, and other essential resources. In the aftermath of a national disaster, emergency, or crisis, the haste in which relief arrives to those in need can never be quick enough.

Generators may be used to generate power and may provide temporary powering means; however a small portion of inhabitants have access to such equipment. Typically, portable generators are not large enough to supply the power demand of many individuals and fuel may not be available during power outages/emergency situations.

Potable water is often needed to revitalize those who are dehydrated in the wake of a disaster such as a flood, earthquake, or terrorist attack. Many times when a disaster strikes, existing potable water sources are contaminated resulting in danger to individuals that may consume such water. Typically, purifying water by the consumer is a slow process that is not readily available or feasible to supply a mass of people. Individuals who are left without means of food preservation and clean water for extended periods of time may become very ill, and may die.

Various attempts have been made to solve the above-mentioned problems such as those found in U.S. Pat. No. and Pub. Nos. 6,289,684; 2006/0257258; 2006/0113251; 6,936,176; 7,089,763 and 6,464,884. This prior art is representative of transportable power generating systems, water purification systems, and multi-functional disaster units. None of the above inventions and patents, taken either singly or in combination, is seen to describe the invention as claimed.

Ideally, a transportable disaster-relief generating system should be readily transportable via a highway accessible vehicle (or air-lift means) and would operate reliably, yet be manufactured at a reasonable expense. Thus, a need exists for a reliable natural disaster relief generating system to generate power, provide access to the power, purify and provide potable water from a non-potable water source, produce fragmented or flake ice utilizing purified water, all within a single enclosure for transport, and to avoid the above-mentioned problems.

BRIEF SUMMARY OF THE INVENTION

In view of the foregoing disadvantages inherent in the known multi-functional disaster relief unit art, the present invention provides a novel natural disaster relief generating system. The general purpose of the present invention, which will be described subsequently in greater detail, is to provide an independently-operable, transportable unit comprising means to generate power, purify and provide potable water from a non-potable water source, and produce ice utilizing purified water.

The natural disaster relief generating system as described herein generally comprises a power generation assembly, a water supply and purification assembly, and an ice maker. The power generation assembly may comprise a power generator, a fuel storage tank, lighting means, and power outputs for supplying emergency power. In a preferred embodiment the power generator comprises a diesel motor. In alternative embodiments the electrical drive motors may be replaced by hydraulically operated motors.

The water supply and purification assembly may comprise an R/O filter, a sand filter, set of particle filters, a non-potable-water intake, a potable-water discharge, a potable water storage tank (and/or bladder), permeate storage tank, a potable water discharge, a pump, and a pressure-tank. In use, non-potable water is pumped into the filtration system of the present invention from a non-potable water source (i.e. tanker truck, ocean water, lake or pond—brackish or other) and is filtered through the sand filter, filter media and R/O filter. The purified water will be stored in the potable water storage tank for ready access to the ice machine and via the potable water discharge. The pressure tank supplies the 'pressurized-force' to move the various water(s) through the system.

In use, non-potable water may be pumped into water filtration assembly via a submersible pump or a hose through the non-potable-water intake. The general purpose of water filtration assembly is to remove pollutants and microorganisms from non-potable or otherwise contaminated water. Non-potable water may pass through an initial filter and trash separator thereby inhibiting larger particles from passing into water filtration assembly while permitting contaminated water to pass there-through. A low-pressure and high-pressure pump may then transfer non-potable water through the various phases of the filtration process. The device comprises non-potable and potable water pumps.

As part of the purification process, water preferably passes through the R/O filter to further remove contaminants. The R/O filter may comprise a dense membrane layer having varying pore sizes. The R/O filter is designed to allow only water to pass through, while preventing the passage of certain solutes. This process requires high pressure to be exerted on the high concentration side of the membrane. Pressurized force(s) may be received from a pressure tank located within the disaster-relief unit. Water filtration assembly may further comprise a chlorine generator to maintain stored water safely.

In certain embodiments the national disaster relief generating system further comprises an ice maker for producing ice. The ice maker receives purified water thereby creating purified ice which may be accessed from the attached ice bin. The ice bin may be a knock-down version and/or portable in certain embodiments.

The present invention may further comprise a storage compartment for storing perishable and non-perishable consumables. The individual components of the national disaster relief generating system are housed within a durable protective enclosure and securably retained by a skid located within and/or under the enclosure, preferably at the base.

The present invention holds significant improvements and serves as a transportable disaster-relief generating system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, natural disaster-relief unit, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a transportable disaster-relief unit and more particularly to a transportable disaster-relief unit as used to improve the rapid accessibility of survival necessities, such as potable water, electricity, ice, for food preservation, in the event of a natural disaster.

Floods, hurricanes, earthquakes, and other disastrous events, as mentioned previously, may cause mass power outages. Without power, many people may lose access to light, clean water, and other essential resources. Generators may be used to temporarily replenish light sources, but often many individuals may be left without adequate means for food preservation and access to purified water for extended periods of time potentially resulting in illness, injury or death.

Referring generally to the present invention, transportable disaster-relief generating system 100 is designed to provide relief to people who may be without water, ice, and power as a result of a disaster. The present invention comprises a transportable power generated unit having means for ice production, non-potable water purification, and electricity generation. The device of the present invention may utilize virtually any type of non-potable water source, such as salt water or otherwise contaminated water, in order to provide sanitary water and ice fit for human consumption in the form of storable potable water. The powering means of the power generator may also provide electricity to provide illumination for areas that have undergone prolonged power failure. The present invention may be best utilized in the immediate wake of a natural disaster to provide survival essentials and to help prevent loss of life.

Figure 1:
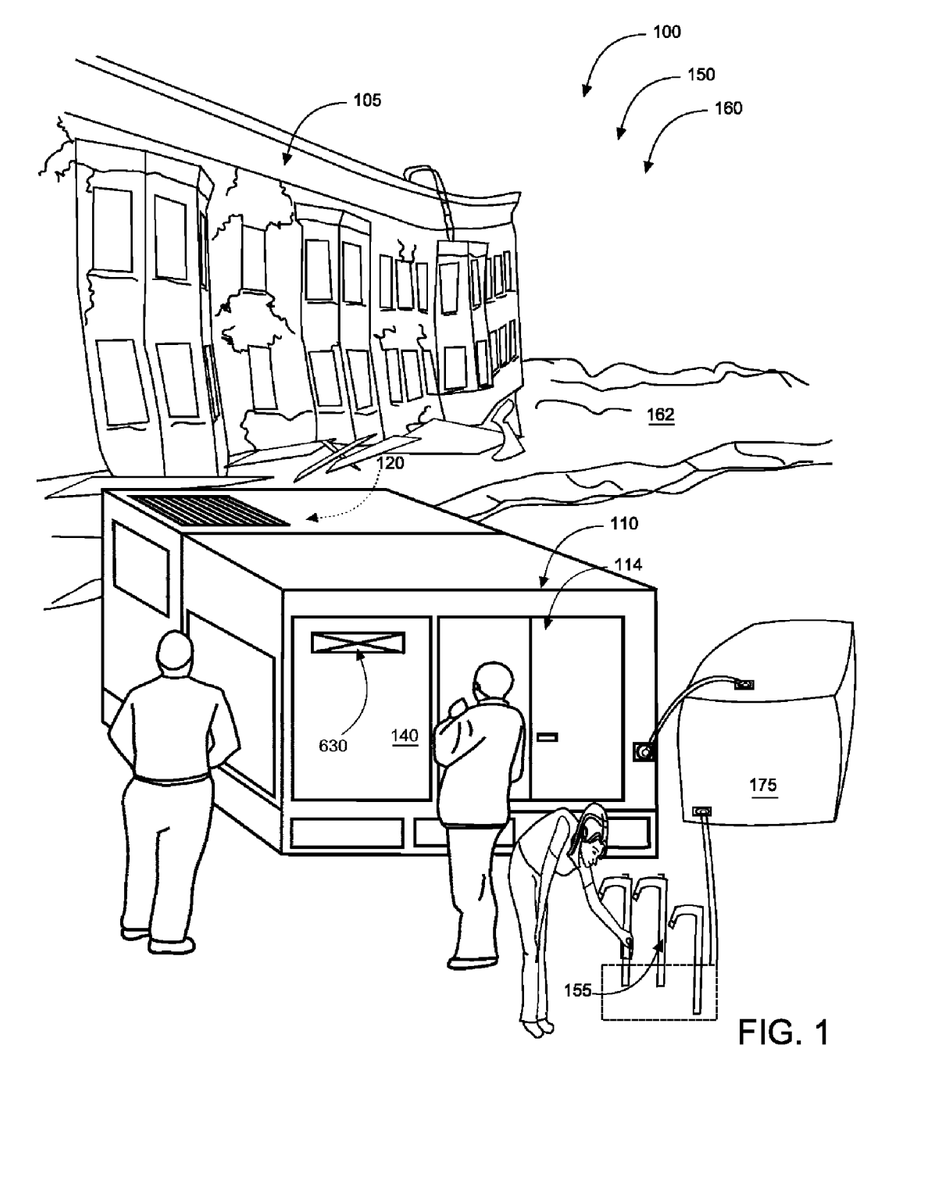
FIG. 1 shows a perspective view illustrating a natural disaster relief generating system in an in-use condition during an emergency condition according to an embodiment of the present invention.

Referring to the drawings by specific numerals of reference there is shown in FIG. 1, a perspective view illustrating transportable disaster-relief generating systems 100 in an in-use condition 150 according to an embodiment of the present invention. Transportable disaster-relief generating systems 100 may comprise disaster-relief unit 110 wherein disaster-relief unit 110 internally comprises power generator 120 for providing electricity. As shown in FIG. 1, power cables 125 may be plugged into power outputs 122 located on exterior surface of disaster-relief unit enclosure 114. Transportable disaster-relief generating systems 100 may provide potable water 130 and generate electricity during an emergency condition 160, such as in the wake of earthquake 162, hurricane 163, terrorist attack 164, or some other catastrophic event. User 140 may extract potable water 130 (as shown) from potable water discharge 155 after earthquake 162 has destroyed building 105, homes, utilities, and other property. Power generator 120 may provide light stanchions for area lighting means.

Power generator 120 may comprise an engine-powered generator unit housed in an enclosure substantially made of steel, aluminum, or other suitable material. In a preferred embodiment, transportable disaster-relief generating systems 100 may comprise a diesel generator, and may be powered by diesel fuel, gasoline, or propane. Power generator 120 is preferably powered by diesel fuel due to the availability of diesel fuel, combined with the relative efficiency and longevity of such engines. The fuel is removably storable in fuel storage tank 405 providing that the present invention may be used remotely to provide power to transportable disaster-relief generating systems 100. Batteries (high-efficiency) or power cells may be used in alternate embodiments.

Figure 2:
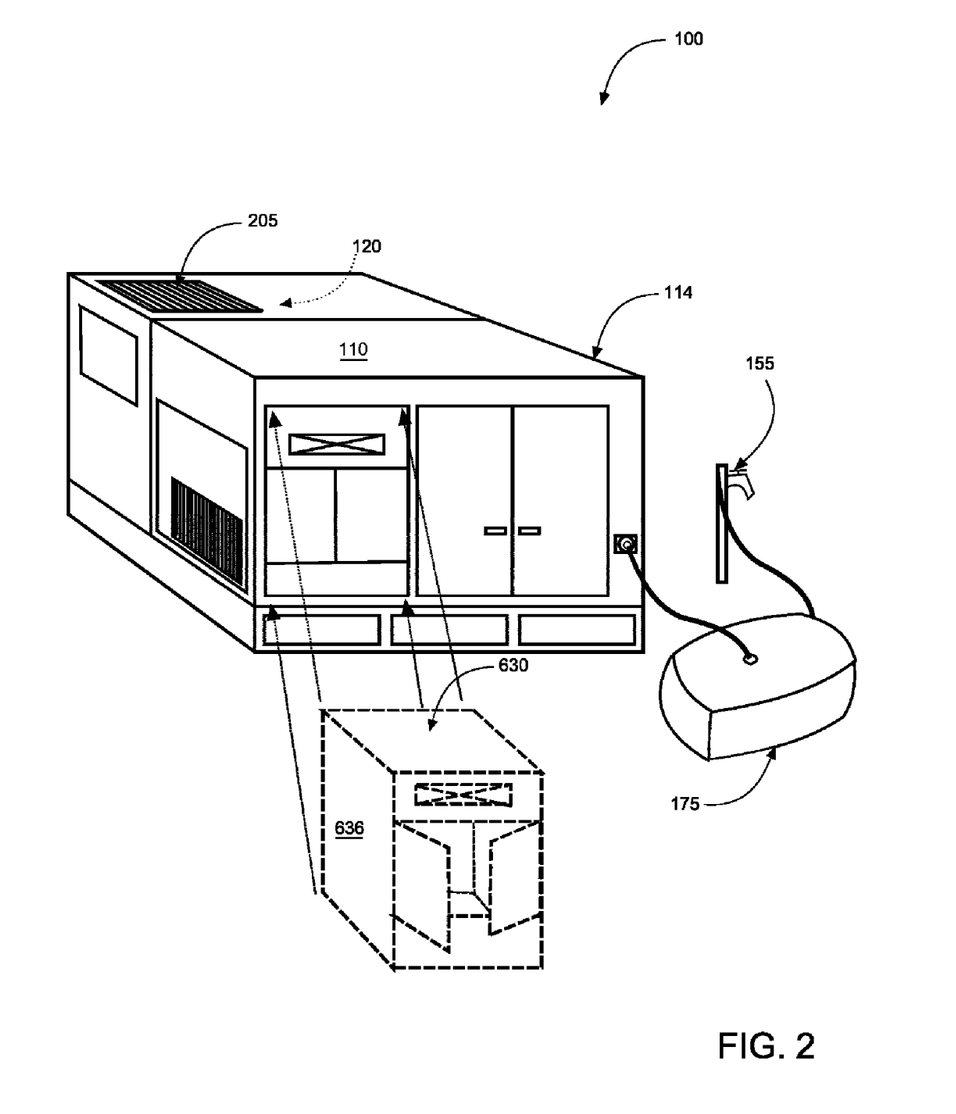
FIG. 2 is a perspective view illustrating the exterior of the natural disaster relief generating system according to an embodiment of the present invention of FIG. 1.

FIG. 2 is a perspective view illustrating transportable disaster-relief generating systems 100 according to an embodiment of the present invention of FIG. 1. As shown, disaster-relief unit 110 may further comprise vent(s) 205 located along top of disaster-relief unit enclosure 114. When transportable disaster-relief generating systems 100 is in an in-use condition 150, heat energy may escape through vent 205 for safety purposes and to cool the system via ambient temperature.

Figure 3:
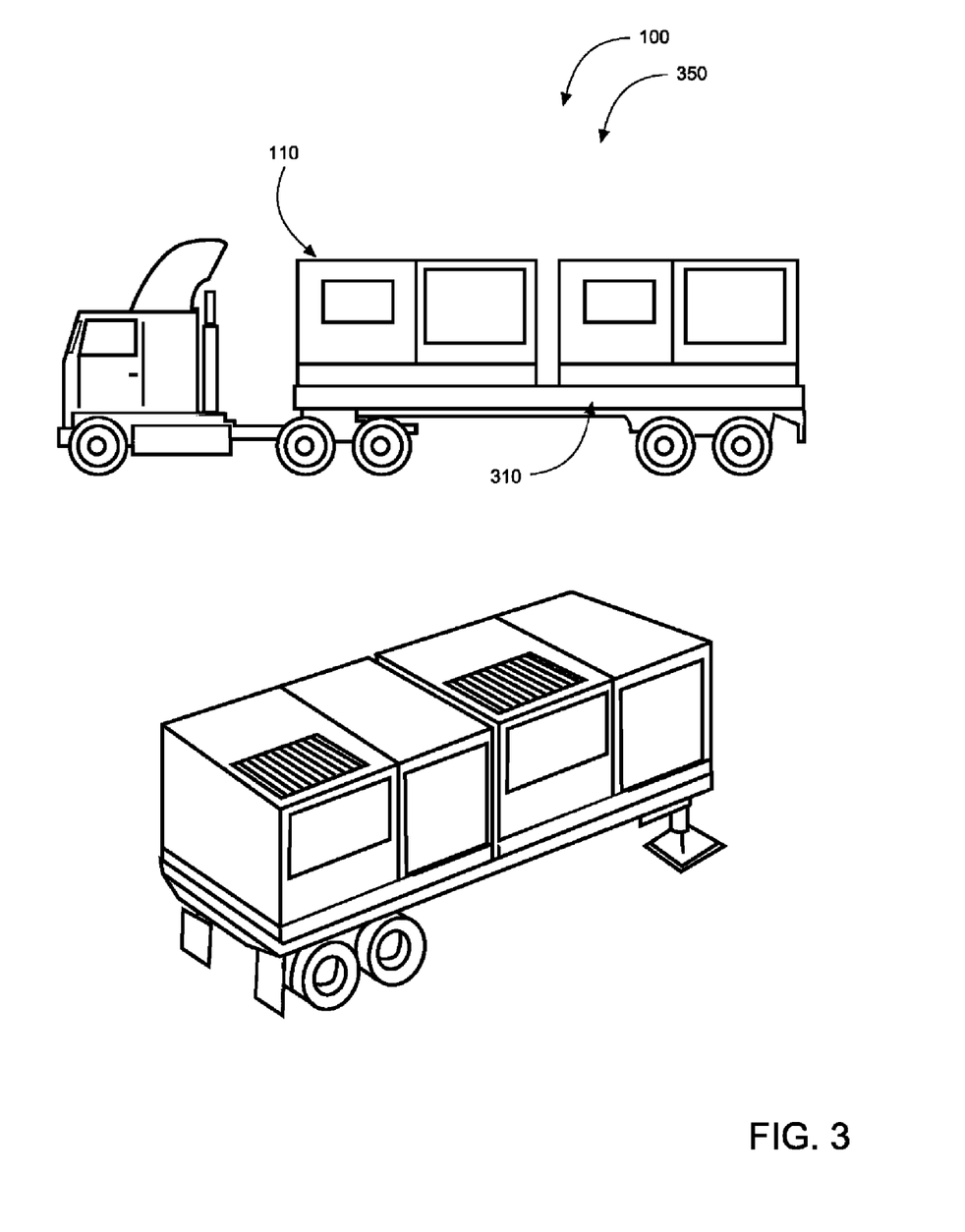
FIG. 3 is a perspective view illustrating the natural disaster relief generating system during (one form of) transport on a highway-accessible flatbed trailer according to an embodiment of the present invention of FIG. 1.

FIG. 3 is a perspective view illustrating transportable disaster-relief generating systems 100 in transportable condition 350 according to an embodiment of the present invention of FIG. 1. As shown, approximately two (2) disaster-relief unit (s) 110 may be transportable on flatbed tractor-trailer 310 which is be highway accessible. In such a manner, transportable disaster-relief generating systems 100 may reach those in need utilizing conventional highways. It should be understood that transportable disaster-relief generating systems 100 may be airlifted in via helicopters and may have suitable lifting lugs located thereon for ease of hooking and unhooking. Alternate transportation means may be employed to move transportable disaster-relief generating systems 100 such as airplanes, boats, track machines and others for instances when roads may be unavailable/unusable.

Figure 4:
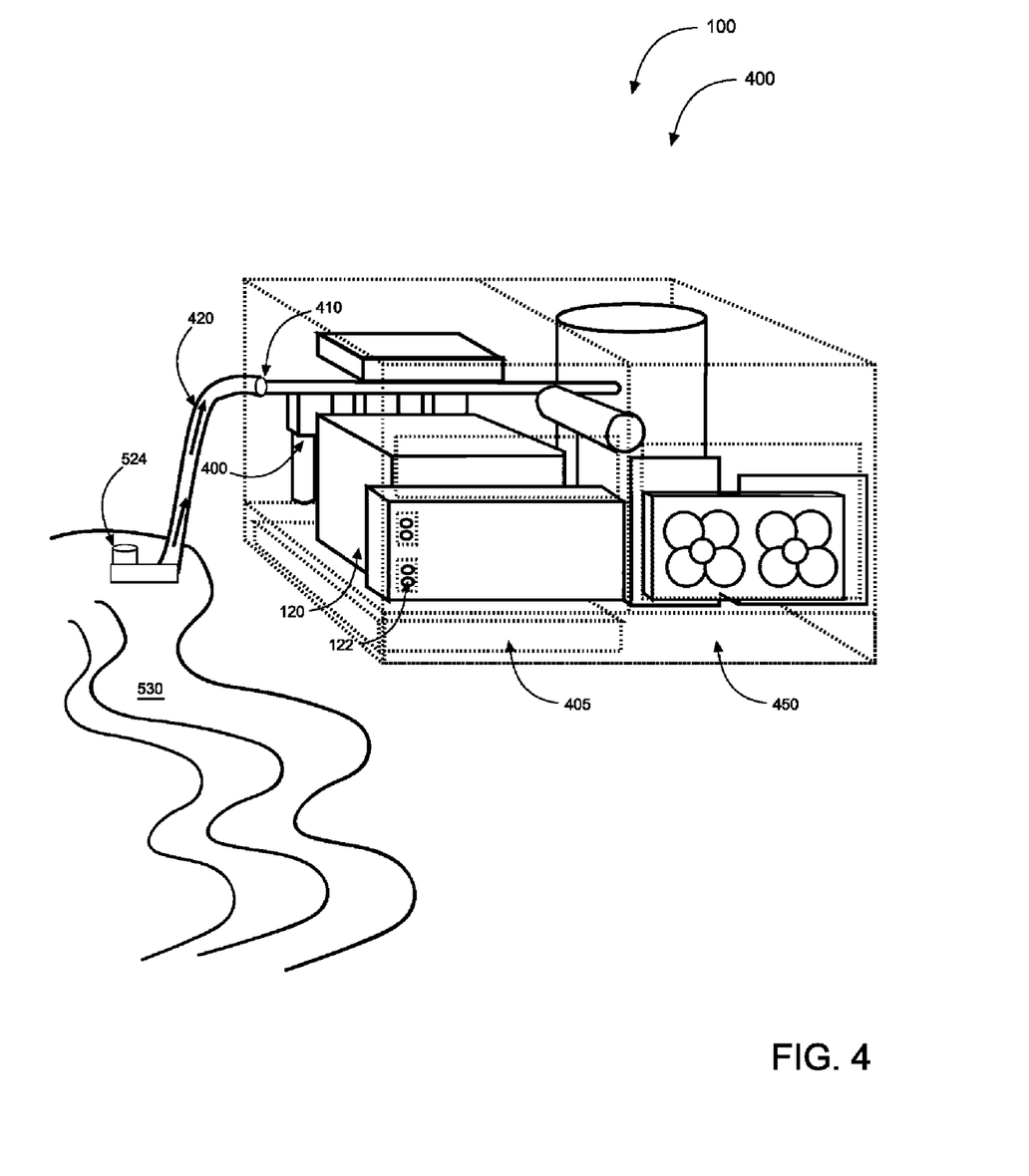
FIG. 4 is a perspective view illustrating the exterior of the natural disaster relief generating unit according to an embodiment of the present invention of FIG. 1.

FIG. 4 is a perspective view illustrating the inside of transportable disaster-relief generating systems 100 according to an embodiment of the present invention of FIG. 1. As shown, fuel storage tank 405 may be located underneath and/or near (adjacent) or remote from power generator 120. In a preferred embodiment, as mentioned above, power generator 120 may comprise diesel generator 505. Fuel storage tank 405 may be used to store diesel fuel for supplying power to diesel generator 505. It is preferred that fuel storage tank 405 be double-walled and located in a relatively cool location away from ignition sources to prevent fuel evaporation loss or explosion. In alternative embodiments of the present invention, power generator 120 may comprise a hydraulically operated unit. Preferably, power generator 120 has a ninety six hour fuel capacity (more or less capacity in various embodiments as per application) thereby providing power for at least a four day operating period, making it efficient in-use, especially during the critical first day after the catastrophic event. Power generator 120, ice maker 560, and water filtration assembly 400 may be mountably-held in place by skid 450, wherein skid 450 may comprise a substantially flat transport structure located along the bottom of disaster-relief unit 110. Skid 450 is preferably consolidated in a base of disaster-relief unit 110. Skid 450 is handy for 'skidding' transportable disaster-relief generating systems 100 along the ground to level and for loading and unloading situations. Skid 450 also provides a mounting point for chains, straps or other when the unit is to be lifted or secured for transport.

With further reference to FIG. 4, non-potable water intake 410 may comprise a receiving inlet on an exterior surface of disaster-relief unit 110. Non-potable water may be received by non-potable water intake 410 via hose 420, submersible pump, or via alternative water transfer means. In use, non-potable water passes into water filtration assembly 400 through non-potable-water intake 410 for purification and consumption. Non-potable-water intake 410 is preferably in communication with at least one non-potable-water source such as a lake, bay, sea, ocean or other body of water. Alternately, the water source may comprise an underground well or tanker truck(s). Non-potable water may comprise virtually any non-purified, brackish or contaminated source such as what is often found in natural disaster settings. It should be appreciated that the present invention is usable in other settings such as those on relief-aid, military missions and remote applications for oil/gas exploration, archeological expeditions and other such circumstances wherein remote power generating for power and potable water supply may be beneficial.

Figure 5:
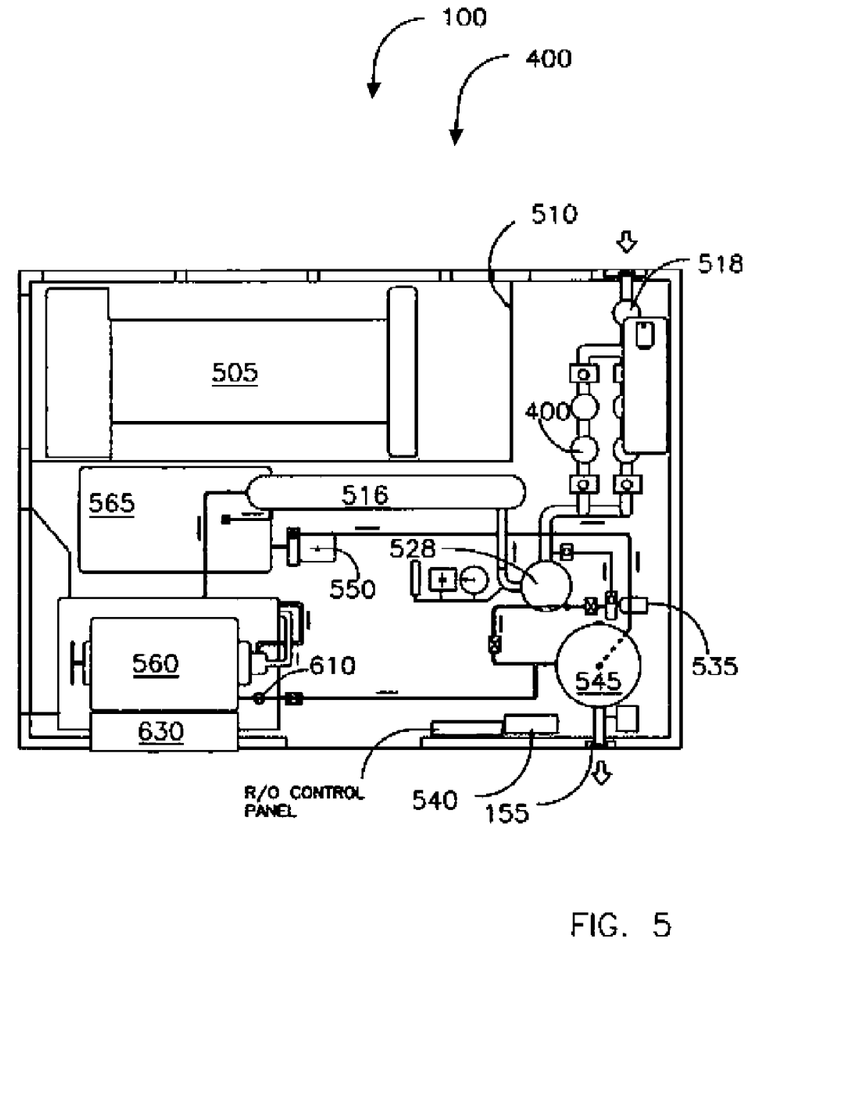
FIG. 5 is a side perspective view illustrating the interior of the natural disaster relief generating unit according to an embodiment of the present invention of FIG. 1.

Now referring to FIG. 5, illustrating an interior perspective of transportable disaster-relief generating systems 100 according to an embodiment of FIG. 1. As discussed, disaster-relief unit 110 comprises power generator 120 wherein power generator 120 preferably comprises diesel generator 505. Power generator 120 may be securably housed within sound-proofing generator enclosure 510 thereby serving to reduce noise created by disaster-relief unit 110. Sound-proofing generator enclosure 510 also may provide protection from moving parts while running. Further, transportable disaster-relief generating systems 100 comprises water filtration assembly 400 which may comprise R/O filter 516, sand filter 518 (sand and trash filter), low-pressure submersible pump 524, high-pressure pump 528, flush pump 535, chlorine generator 540, pressure tank, and potable water storage tank 545. The present system may use bladder 175 for ease of storing/access by multiple individuals, as indicated in FIG. 1.

Reverse osmosis is a filtration method that may be used to remove many types of large molecules and ions from solutions by applying pressure to the solution when it is on one side of a selective membrane. R/O filter 516 of the present invention may comprise a cylindrical membrane capable of reversing osmotic pressure thereby reversing the flow of liquid passing there-through. In such a manner, salt, particles, and other substances may be separated from water molecules providing potable water for discharge via potable water discharge 155.

In use, non-potable water may be pumped into water filtration assembly 400 via non-potable-water intake 410 from non-potable water source 530. The general purpose of water filtration assembly 400 is to remove pollutants and microorganisms from non-potable or otherwise contaminated water. Non-potable water may pass through an initial filter and trash separator thereby inhibiting larger particles to pass into water filtration assembly 400 while permitting contaminated water to pass there-through. Low-pressure filter pump 524 may then transfer non-potable water through the first phase of the filtration process. Non-potable water may pass through sand filter(s) 518 comprising a plurality of micron filters and carbon block filters. In one embodiment of transportable disaster-relief generating systems 100, sand filter 518 may comprise rapid gravity sand filter utilizing relatively coarse sand and other granular media to remove particles and impurities from non-potable water. In an alternative embodiment of the present invention, sand filter 518 may comprise slow sand filters for treating raw water to produce potable water at a slow, constant flow rate. It should further be appreciated that water filtration assembly 400 may further comprise ozone sterilization for the additional purification of non-potable water if desired. In certain embodiments at least one set of particle filters may be used in water filtration assembly 400.

After non-potable water passes through sand filter 518, carbon and particle filters 400, high pressure pump 528 may transfer water through R/O filter 516 to further remove contaminants for optimal purification. The R/O filter 516 may comprise a dense membrane layer having pore sizes which may vary from 0.1 nanometers ($3.9 \times 10^{-9}$ in) to 5,000 nanometers (0.00020 in). R/O filter 516 is designed to allow only water to pass through, while preventing the passage of certain solutes. This process requires high pressure to be exerted on the high concentration side of the membrane, usually about 2-17 bar (30-250 psi) for fresh and brackish water, and about 40-70 bar (600-1000 psi) for seawater. Pressurized pushing force may be communicated/received from high pressure pump 528 located within disaster-relief unit 110. Carbon block or activated carbon filters will eliminate chlorine, which will attack and degrade thin film composite membranes of water passing through R/O filter 516. Once purified by R/O filter 516, potable water may then be transferred via pressure pump 550 to either ice maker permeate tank 565 for use with ice maker 560, and/or to potable water storage tank 545 for user accessibility via potable water discharge 155.

In referring now to submersible pumps 524 that may work cooperatively with transportable disaster-relief generating systems 100 for transferring non-potable water into non-potable-water intake 410, the optimum type of pump to use depends on the system discharge conditions and application. Preferably, submersible salt water pump comprises stainless steel for the longest possible life under such conditions.

Figure 6:
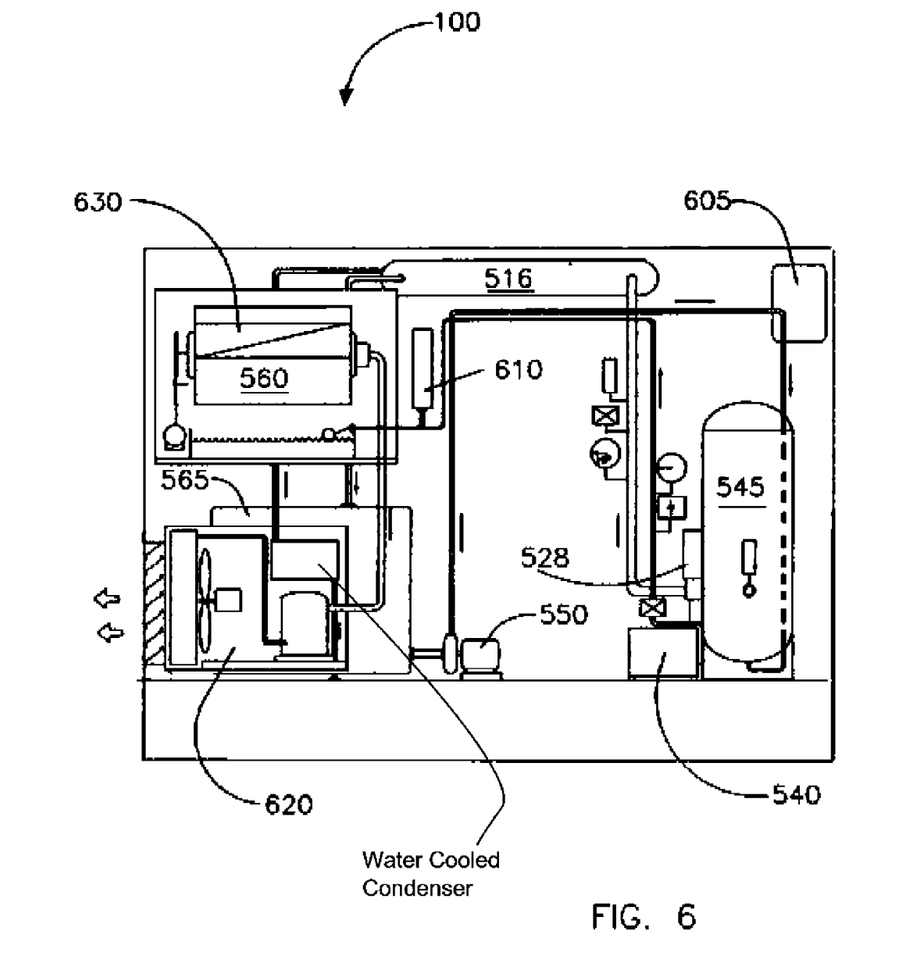
FIG. 6 is a side perspective view illustrating the interior of the natural disaster relief generating unit according to an embodiment of the present invention of FIG. 1

In referring to FIGS. 5 and 6, ice maker 560 may comprise ice maker condensing unit 620, flake ice maker 560 and ice chute 630. In use, ice maker 560 preferably receives purified water stored in permeate tank 565. Water is then transferred into ice maker condensing unit 620 where high pressure vapor is condensed into high pressure liquid as part of the refrigeration cycle. In one embodiment, ice maker condensing unit 620 may comprise an air cooled condenser. In other embodiments, ice maker condensing unit 620 may comprise a water-cooled condenser. Pressurized water may then be sent to flake ice maker 560 wherein ice may be generated. Ice may pass from flake ice maker 560 into portable ice bin 636 (which may be removable and may be made from a set-up of lightweight insulated panels that may form a knockdown construction) via ice chute 630 via automatic control means. Ice maker 560 generates ice from potable water wherein ice may be used to store perishable comestibles, to provide cooling means for use in medical applications, for cooling potable water, and other such applications.

Furthermore, water discharged via the water purification process that is waste may be recycled to condense the refrigerant from ice maker 560. Control valves may sense if the incoming water is sufficient to condense the refrigerant. If the R/O system is shut down for service, the air-cooled ice maker 620 will function. In this manner the present invention may be efficient and environmentally-friendly. It is preferable that transportable disaster-relief generating systems 100 is environmentally-friendly, thus not contributing to pollution in an already potentially polluted location. Additionally, this provides user(s) 140 with a healthier environment.

In further reference to the water purification process of transportable disaster-relief generating systems 100, water filtration assemblies 400 and 516 may comprise of anti-salient liquid tank 605 with self-contained liquid pump 606, this system designed to prevent the buildup on filter media, thereby prolonging membrane life. The water feed to ice machine 560 requires a certain hardness in order for the ice to be harvested; salt feeder 610 provides this necessary hardness.

Figure 7:
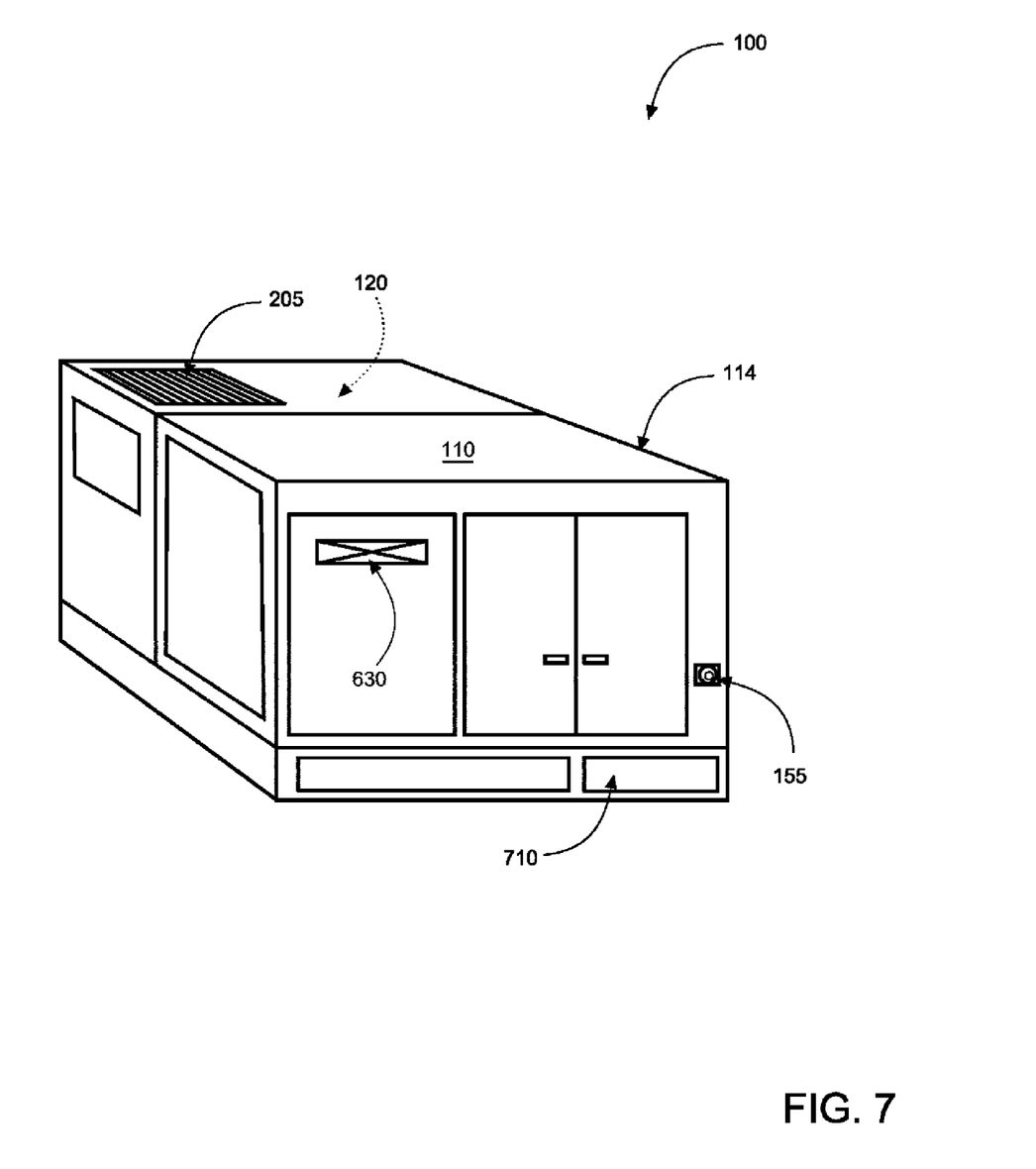
FIG. 7 is a perspective view illustrating a storage compartment according to an embodiment of the present invention of FIG. 1.

FIG. 7 is a perspective view illustrating (an optional) storage compartment 710 according to an embodiment of the present invention of FIG. 1. As shown, transportable disaster-relief generating systems 100 may comprise at least one storage compartment 710 located beneath (or in another suitable location) power generator 120 and water filtration assembly 400. In one embodiment, storage compartment 710 may comprise a slidable compartment that may be opened and securely closed. Further, other commodities and necessities such as medicine, first aid, and other consumable items may be securably stored in storage compartment 710.

Figure 8:
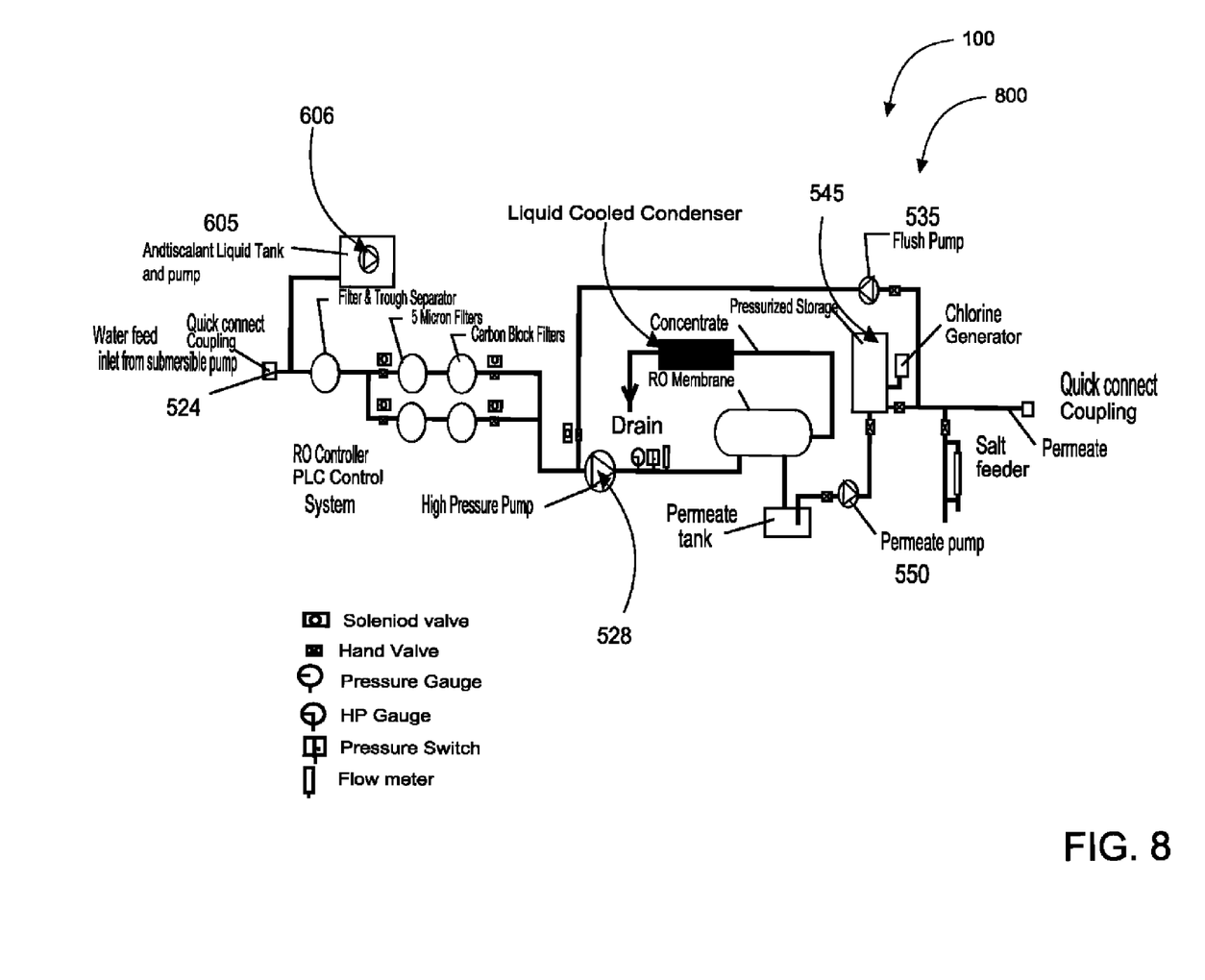
FIG. 8 is a flowchart illustrating a water filtration process according to an embodiment of the present invention of FIG. 1.

In referring now to FIG. 8, filtration process flow-chart 800 is shown illustrating the water filtration process of transportable disaster-relief generating systems 100 according to an embodiment of the present invention of FIG. 1. When disaster-relief unit 110 is in an in-use condition 150, non-potable water may enter water filtration assembly 400 via non-potable-water intake 410. The trash separator serves to inhibit larger particles from passing into water filtration assembly 400.

Low-pressure submersible pump 524 may then transfer non-potable water through sand filter 518. Pump 528 may transfer water through R/O filter 516 to further remove contaminants for optimal purification. R/O filter 516 is designed to allow only water to pass through, while preventing the passage of certain solutes. The permeate flows by gravity to tank 565 and then pump 550 transfers permeate to pressure tank 545 for distribution to ice machine 560 and bladder 175 storage through potable water discharge 155. Pressurized force may be received from pressure tank 545. Water may be further treated by chlorine from chlorine generator 540 to maintain stored water in a safe manner.

Figure 9:
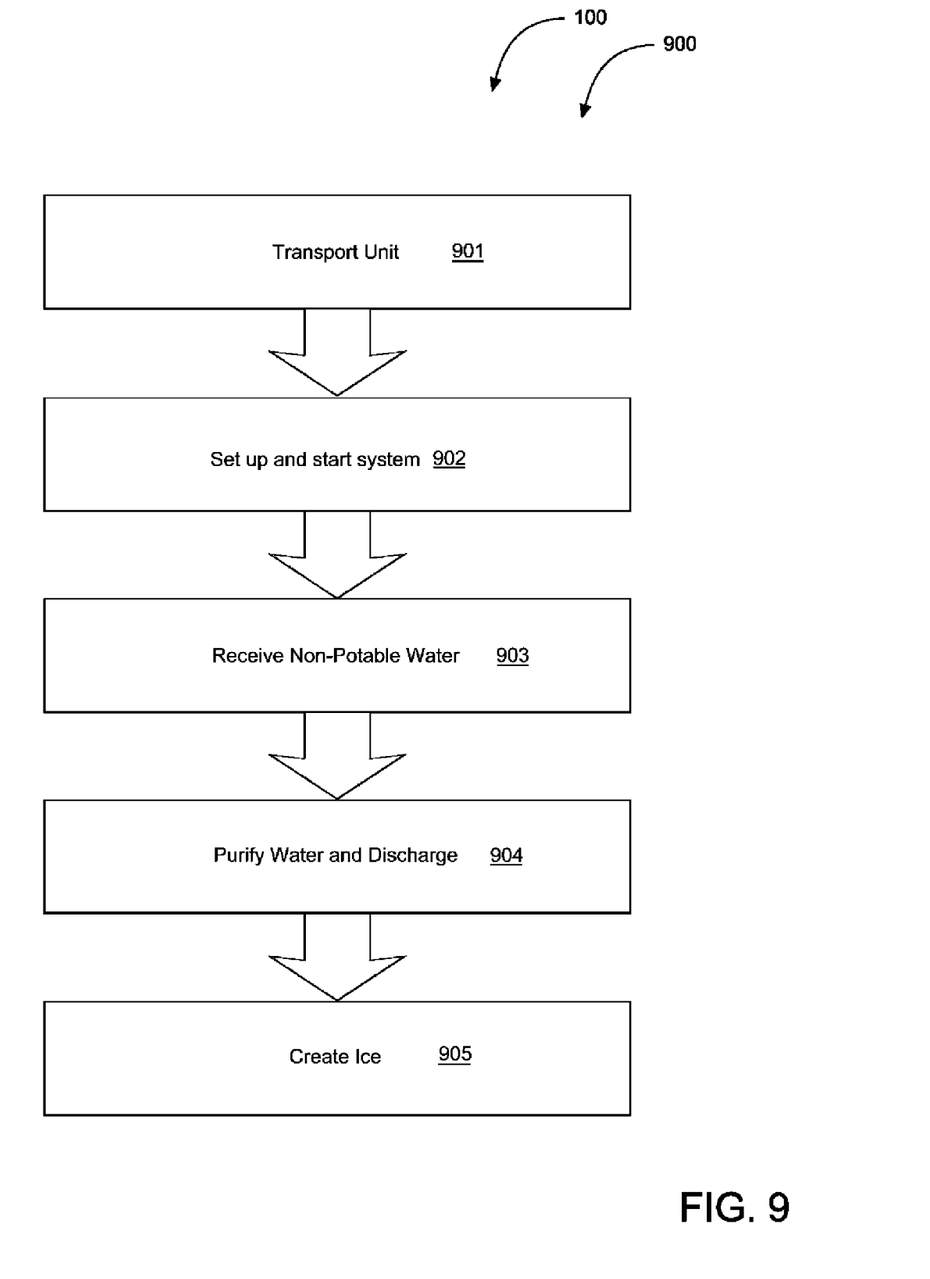
FIG. 9 is a flowchart illustrating a method of use of the natural disaster-relief unit according to an embodiment of the present invention of FIGS. 1-8.

FIG. 9 is a flowchart illustrating method of use 900 of transportable disaster-relief generating systems 100 according to an embodiment of the present invention of FIGS. 1-8. Method of use 900 may comprise the steps of: step one 901 transporting at least one disaster-relief unit 110 to a disaster zone via highway accessible flatbed tractor-trailer 310 (or other suitable transportation means), step two 902 set-up and start-up of system, supplying power via power generator 120, step three 903 receiving a non-potable water supply via non-potable-water intake 410, step four 904 purify water via water filtration assembly 400 and discharging potable water via potable water discharge 155, and step five 905 creating ice via ice maker 560.

It should be noted that step five 905 may or may not be optional step and may not be implemented in all cases. Optional steps of method of use 900 are illustrated using dotted lines in FIG. 9 so as to distinguish them from the other steps of method 900.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A portable disaster-relief generating system comprising:
   a) at least one power generator;
   b) at least one double walled fuel storage tank;
   c) at least one reverse osmosis filter;
   d) at least one ozone sterilizer;
   e) at least one set of particle filters;
   f) an ice generator with at least one salt feeder providing necessary hardness;
   g) at least one non-potable-water intake; at least one potable water discharge; at least one non-potable water pump; at least one potable water pump;
   h) at least one permeate storage tank, the ice generator with at least one salt feeder being coupled to receive permeate from the at least one permeate storage tank which receives permeate from the reverse osmosis filter;
   i) at least one pressure-tank;
   j) at least one system enclosure
   k) at least one electrical power outlet accessible from exterior of said system enclosure;
   l) at least one heat energy escape vent from said system enclosure;
   m) at least one helicopter lifting lug;
   n) wherein said at least one non-potable-water intake is in communication with at least one non-potable-water source;
   o) wherein said at least one reverse osmosis filter and said at least one ozone sterilizer, and said set of particle filters comprise a water purification assembly;
   p) wherein said pump delivers said non-potable water from said non-potable-water intake to said water purification assembly;
   q) wherein said non-potable water source is purified and converted into a potable water source, permeate flowing into said permeate storage tank then pumped into said pressure-tank;
   r) wherein said at least one pressure-tank pressurizes said potable water to supply said at least one potable water discharge;
   s) wherein said potable water pump and said non-potable water pump communicate said potable water and said non-potable water throughout said portable disaster-relief generating system;
   t) wherein said ice generator with at least one salt feeder produces ice from said potable water;
   u) wherein said at least one power generator is powered by fuel that is storable in said at least one fuel storage tank;
   v) wherein said at least one power generator provides power to said portable disaster-relief generating system; and
   w) wherein said portable disaster-relief generating system is used in response to an emergency event to sanitarily provide water and ice.

2. The portable disaster-relief generating system of claim 1 wherein said power generator comprises a diesel motor.

3. The portable disaster-relief generating system of claim 1 wherein said fuel storage tank comprises a volume sufficient to provide said power generator with said fuel for about a ninety six hour successive running-period.

4. The portable disaster-relief generating system of claim 1 further comprising an outer sound-proofing enclosure.

5. The portable disaster-relief generating system of claim 1 wherein said water purification assembly further comprising a chlorine generator chlorine sterilization.

6. The portable disaster-relief generating system of claim 1 wherein said portable disaster-relief generating system is transportable on a highway-accessible flat-bed trailer.

7. The portable disaster-relief generating system of claim 1 further comprising a storage compartment for storing at least one consumable item.

8. The portable disaster-relief generating system of claim 1 further comprising a removable ice bin.

9. The portable disaster-relief generating system of claim 8 wherein said ice generator comprises an ice discharger for discharging purified ice to attached said removable ice bin.

10. The portable disaster-relief generating system of claim 1 further comprises a skid consolidated in a base of said portable disaster-relief generating system.

11. The portable disaster-relief generating system of claim 1 wherein said power generator provides light stanchions for area lighting.

12. The portable disaster-relief generating system of claim 1 further comprising a chlorine generator.

13. The portable disaster-relief generating system of claim 1 wherein said water purification assembly further comprises a water purification control panel for controlling a water purification process.

14. The portable disaster-relief generating system of claim 1 wherein said power generator further comprises an engine control panel for configuring said power generator.

15. A transportable disaster-relief generating system comprising:
   a) a power generator comprising a diesel motor housed within an outer sound-proofing enclosure;
   b) a double walled fuel storage tank comprising a volume sufficient to provide said diesel motor with fuel for about a ninety-six hour successive running-period;
   c) a water filtration assembly comprising at least one R/O filter, at least one sand filter, at least one reverse osmosis filter, at least one ozone sterilizer, at least one pump, at least one pressure tank, at least one permeate storage tank, and a non-potable water intake for receiving non-potable water;
   d) an ice maker comprising an ice maker condensing unit, a salt feeder providing necessary hardness, flake ice maker, and a sanitary knockdown portable ice bin, the ice generator with at least one salt feeder being coupled to receive permeate from the at least one permeate storage tank which receives permeate from the reverse osmosis filter;
   e) an outer enclosure for housing said transportable disaster-relief generating system comprising a hard durable material, area lighting means and at least one potable water discharge;
   f) a storage compartment for storing at least one consumable item;
   g) wherein said fuel is storable in said fuel storage tank;
   h) wherein said pump delivers said non-potable water from said non-potable-water intake to said water filtration assembly;
   i) wherein said water filtration assembly purifies said non-potable water into potable water and stores said potable water as permeate in said at least one potable water storage tank;
   j) wherein said at least one pressure-tank pressurizes said potable water to supply said at least one potable water discharge;

k) wherein said ice maker generates ice from said potable water;
l) wherein said ice maker comprises said ice maker condensing unit that further comprises a water-cooled condenser or an air-cooled condenser;
m) wherein said ice maker condensing unit recycles waste water discharged from a water purification process to condense refrigerant from said ice maker condensing unit;
n) wherein said removable ice bin further comprises lightweight insulated panels that form a knockdown construction;
o) wherein said power generator provides power to said transportable disaster-relief generating system; and
p) wherein said transportable disaster-relief generating system is used in response to an emergency event to transport said at least one consumable item and to provide electricity, purified water, and ice.

16. The portable disaster-relief generating system of claim 15 wherein said power generator comprises a hydraulically operated unit.

17. The portable disaster-relief generating system of claim 15 wherein said power generator comprises a power cell.

18. The portable disaster-relief generating system of claim 15 wherein a refrigerant condenser recycles waste water discharged from the water purification process to condense refrigerant from ice maker condensing unit.

19. The portable disaster-relief generating system of claim 15 further comprising a cooled storage compartment for use in medical applications.

20. The portable disaster-relief generating system of claim 15 wherein said non-potable water pump comprises at least one stainless steel submersible salt water pump.

* * * * *